No. 750,495. PATENTED JAN. 26, 1904.
J. SCHWEINFÜRTH.
HARROW TOOTH.
APPLICATION FILED APR. 3, 1903.
NO MODEL.

No. 750,495. Patented January 26, 1904.

UNITED STATES PATENT OFFICE.

JOHANN SCHWEINFÜRTH, OF RICHEN, GERMANY.

HARROW-TOOTH.

SPECIFICATION forming part of Letters Patent No. 750,495, dated January 26, 1904.

Application filed April 3, 1903. Serial No. 150,950. (No model.)

*To all whom it may concern:*

Be it known that I, JOHANN SCHWEINFÜRTH, a subject of the Emperor of Germany, and a resident of 147 Hauptstrasse, Richen, Baden, Germany, have invented a certain new and useful Harrow-Tooth, (for which I have filed application for protection of a useful design in Germany on January 28, A. D. 1903, No. 192,545;) and I do hereby declare the following to be a full, clear, and exact description of the invention, such as will enable others skilled in the art to which it appertains to make and use the same.

This invention relates to an improved construction of harrow-tooth.

Figure 1:
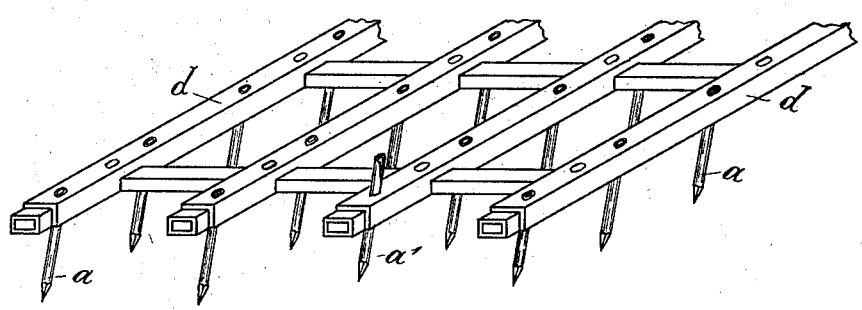
Figures 2, 3:
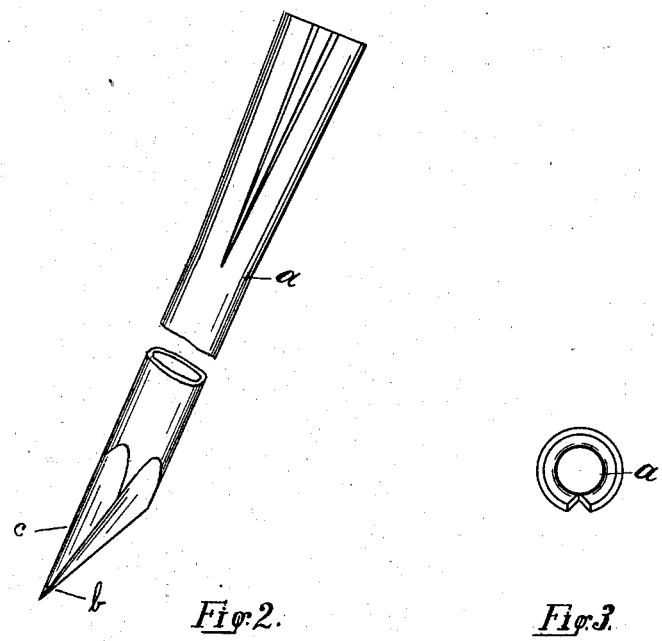

In the drawings, Figure 1 is a perspective view of part of a harrow-frame with the teeth in position. Fig. 2 is an elevation of one of the teeth to a larger scale. Fig. 3 is a plan of the tubular shank of the tooth.

The point $b$ of the tooth is formed at the end of a metal tube $a$ in such a way that the front edge $c$ of the tooth is in line with the contiguous part of the tube, while the other edges form angles therewith, so as to produce a point inclined as a whole to the axis of the tube in a forward direction. The shank or part of the tube above the point is split at the top and splayed, as shown in Figs. 2 and 3.

The teeth are inserted through suitably-shaped holes in the frame $d$, into which they are driven from above and in which they hold by the friction and resiliency of the split shank without other fastening device. The teeth are inserted and held with the fore edge $c$ in the working direction, so as to enable the teeth to enter the soil with ease and certainty.

For purposes of change or repair the teeth are simply knocked upward out of the frame $d$.

What I claim as my invention, and desire to secure by Letters Patent, is—

A harrow-tooth characterized by a tooth-body in the shape of a closed pipe, a closed point at the lower end of said body, the fore edge $c$ of said point lying in the same line with the body, the upper part of the pipe having a short fissure, so that when the tooth is forced into the harrow-frame the fissured part acts as a spring and holds the tooth firmly in the frame.

In witness whereof I have hereunto set my hand in the presence of two witnesses.

JOHANN SCHWEINFÜRTH.

Witnesses:
 JACOB ADRIAN,
 FRED SCHMIDT.